(12) United States Patent
Kwon

(10) Patent No.: US 11,662,331 B2
(45) Date of Patent: May 30, 2023

(54) NANOBIO SENSING DEVICE

(71) Applicant: Hyun Hwa Kwon, Gumi-si (KR)

(72) Inventor: Hyun Hwa Kwon, Gumi-si (KR)

(73) Assignee: Hyun Hwa Kwon, Gumi-si (KR)

( * ) Notice: Subject to any disclaimer, the term of this patent is extended or adjusted under 35 U.S.C. 154(b) by 330 days.

(21) Appl. No.: 17/084,872

(22) Filed: Oct. 30, 2020

(65) Prior Publication Data

US 2021/0199620 A1 Jul. 1, 2021

(51) Int. Cl.
*G01N 27/414* (2006.01)
*G01N 27/419* (2006.01)

(52) U.S. Cl.
CPC ....... *G01N 27/4145* (2013.01); *G01N 27/419* (2013.01); *G01N 27/4146* (2013.01)

(58) Field of Classification Search
CPC ............. G01N 27/4146; G01N 27/419; G01N 27/4145
USPC ....................................................... 257/253
See application file for complete search history.

(56) References Cited

U.S. PATENT DOCUMENTS

2015/0330941 A1\* 11/2015 Smith ............... H01L 29/42384
257/253

FOREIGN PATENT DOCUMENTS

| KR | 10-2006-0036487 A | 4/2006 |
| KR | 10-2011-0116461 A | 10/2011 |
| KR | 10-2013-0036484 A | 4/2013 |
| KR | 10-1706732 B | 2/2017 |
| KR | 10-2018-0110414 A | 10/2018 |

\* cited by examiner

*Primary Examiner* — Hrayr A Sayadian
(74) *Attorney, Agent, or Firm* — NKL Law; Jae Youn Kim

(57) ABSTRACT

A nanobio-sensing device includes: a substrate; a source electrode and a drain electrode which are disposed on the substrate and spaced apart from each other; a sensing film which serves as a channel connecting the source electrode and the drain electrode and is in contact with at least a part of the source electrode and the drain electrode; a first gate electrode which is a floating gate, extends while one end of the first gate electrode is in contact with a part of the sensing film, and is capable of being in contact with a part of the source electrode and/or the drain electrode; and a second gate electrode which is in contact with the other end of the first gate electrode to form a first gate stacked structure.

9 Claims, 6 Drawing Sheets

NANOBIO SENSING DEVICE

CROSS-REFERENCE TO RELATED APPLICATIONS

This application claims priority under 35 U.S.C. § 119 to Korean Patent Application No. 10-2019-0107162, filed on Aug. 30, 2019 entitled "NANOBIO SENSING DEVICE," the contents of which are incorporated herein by reference.

BACKGROUND

1. Field

The present disclosure described herein pertains generally to a nanobio-sensing device including one or more floating gates, and a method of sensing a target material using the nanobio-sensing device.

2. Description of Related Art

Many test methods used to diagnose various diseases, such as cancer and diabetes, are based on detection of signals, such as colorimetric or fluorescence detection by enzymatic reaction, but recently, immunoassay methods using immune reaction between antigen and antibody have also been commonly used. Such immunoassay methods mostly use optical measurement methods based on catalytic reaction of enzyme and photolabeling. However, the optical measurement method has drawbacks in that it necessarily requires biochemical procedures that must be performed by experienced laboratory researchers, the devices used for analysis are large and expensive, and the time required for analysis is long.

RELATED ART DOCUMENT

KR2011-0116461 A

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a nanobio-sensing device including one or more floating gates, and a method of sensing a target material using the nanobio-sensing device.

A first aspect of the present disclosure provides a nanobio-sensing device including: a substrate; a source electrode and a drain electrode disposed on the substrate and spaced apart from each other; a sensing film which serves as a channel connecting the source electrode and the drain electrode and is in contact with at least a part of the source electrode and the drain electrode; a first gate electrode which is a floating gate, extends while one end thereof is in contact with a part of the sensing film, and is capable of being in contact with a part of the source electrode and/or the drain electrode; and a second gate electrode which is in contact with the other end of the first gate electrode to form a first gate stacked structure.

A second aspect of the present disclosure provides a nanobio-sensing device including: a substrate; a source electrode and a drain electrode disposed on the substrate and spaced apart from each other; a sensing film which serves as a channel connecting the source electrode and the drain electrode and is in contact with at least a part of the source electrode and the drain electrode; a first gate electrode which is a floating gate, extends while one end thereof is in contact with a part of the sensing film, and is capable of being in contact with a part of the source electrode and/or the drain electrode; a second gate electrode which is a floating gate and has one end in contact with a part of the other end of the first gate electrode to form a first gate stacked structure; and a third gate electrode in contact with a part of the other end of the second gate electrode to form a second gate stacked structure.

A third aspect of the present disclosure provides a method of sensing a target material, wherein a concentration of a target material is measured by using the nanobio-sensing device according to the first aspect or the second aspect.

Other features and aspects will be apparent from the following detailed description, the drawings, and the claims.

Figure 1:
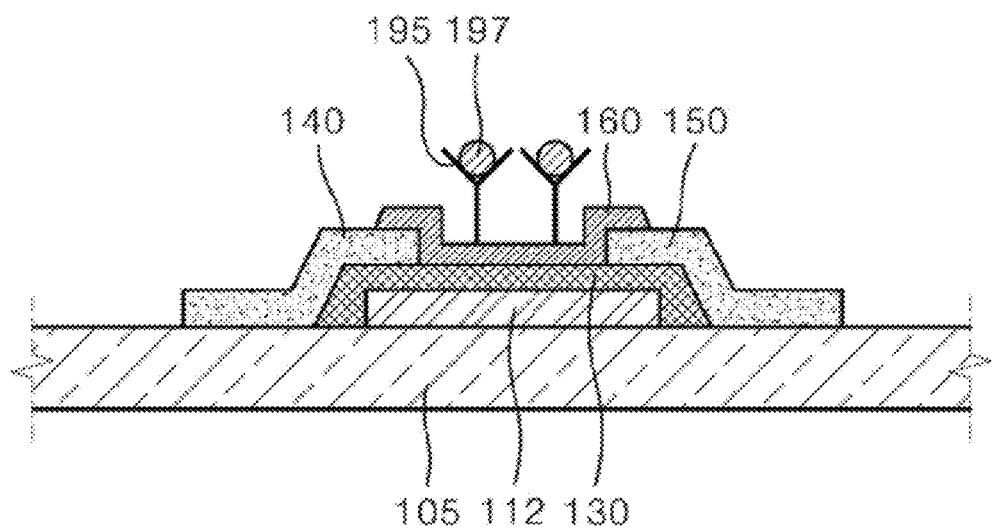
FIG. 1 is a schematic diagram showing a structure of a bio-sensing device according to a prior art.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, the present disclosure will be described in detail with reference to the accompanying drawings so that inventive concept may be readily implemented by those skilled in the art. However, it is to be noted that the present disclosure is not limited to the present disclosure, but can be realized in various other ways. In the drawings, the present disclosure not directly relevant to the description are omitted to enhance the clarity of the drawings, and like reference numerals denote like parts throughout the whole document of the present disclosure.

The detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the whole document of the present disclosure, the terms "connected to" or "coupled to" are used to designate a connection or coupling of one element to another element and include both a case where an element is "directly connected or coupled to" another element and a case where an element is "electronically connected or coupled to" another element via still another element.

Throughout the whole document of the present disclosure, the term "on" that is used to designate a position of one element with respect to another element includes both a case that the one element is adjacent to the another element and a case that any other element exists between these two elements.

Throughout the whole document of the present disclosure, the term "comprises or includes" and/or "comprising or including" means that one or more other components, steps, operations, and/or the existence or addition of elements are not excluded in addition to the described components, steps, operations and/or elements. Throughout the whole document of the present disclosure, the terms "about or approximately" or "substantially" are intended to have meanings close to numerical values or ranges specified with an allowable error and intended to prevent accurate or absolute numerical values disclosed for understanding of the present invention from being illegally or unfairly used by any unconscionable third party. Throughout the whole document of the present disclosure, the term "step of" does not mean "step for."

Throughout the whole document of the present disclosure, the term "combinations of" included in Markush type description means mixture or combinations of one or more components, steps, operations and/or elements selected from a group consisting of components, steps, operation and/or elements described in Markush type and thereby means that the disclosure includes one or more components, steps, operations and/or elements selected from the Markush group.

Hereinafter, illustrative embodiment and Examples of the present disclosure will be explained with reference to the accompanying drawings. However, the present disclosure may not be limited to the illustrative embodiment, the Examples, and the drawings.

A first aspect of the present disclosure provides a nanobio-sensing device including: a substrate; a source electrode and a drain electrode disposed on the substrate and spaced apart from each other; a sensing film which serves as a channel connecting the source electrode and the drain electrode and is in contact with at least a part of the source electrode and the drain electrode; a first gate electrode which is a floating gate, extends while one end thereof is in contact with a part of the sensing film, and is capable of being in contact with a part of the source electrode and/or the drain electrode; and a second gate electrode which is in contact with the other end of the first gate electrode to form a first gate stacked structure.

In the nanobio-sensing device of the first aspect of the present disclosure, an insulating layer may be included between the source electrode, the drain electrode, the sensing film, and the first gate electrode; and between the first gate electrode and the second gate electrode. Specifically, the insulating film may include a silicon oxide film, a silicon nitride film, or an insulating thin film containing silicon oxide, but is not limited thereto.

In the nanobio-sensing device according to the first aspect of the present disclosure, the first gate stacked structure is provided with an open area including a receptor attached to the first gate electrode and capable of binding to a target material.

Referring to FIG. 1, a bio-sensing device according to a prior art includes a substrate 105 on which a gate electrode 112, a source electrode 140, and a drain electrode 150 are disposed, and a sensing film 160 is disposed between the source electrode 140 and the drain electrode 150. In this case, a receptor 195 is attached onto a receptor area on the sensing film 160. Electrical charges with a polarity opposite to that of electrical charges generated when a target material 197 is bound to the receptor 195 affect the sensing film 160 and an electrode forming a channel on the other end of the gate, which causes electrical characteristics to change. By measuring the change in the channel current thereby induced in the sensing film between the source electrode 140 and the drain electrode 150, the concentration of the target material 197 may be quantified. However, since a predetermined voltage is applied to the gate electrode 112 of FIG. 1, this may affect the channel current of the sensing film, which may make it difficult to accurately measure the current change. In addition, since the sensing film 160 may be in direct contact with a liquid sample containing the target material 197, the sensing film 160 is contaminated by the liquid sample, which may make it difficult to accurately measure the electrical characteristics.

Figure 2:
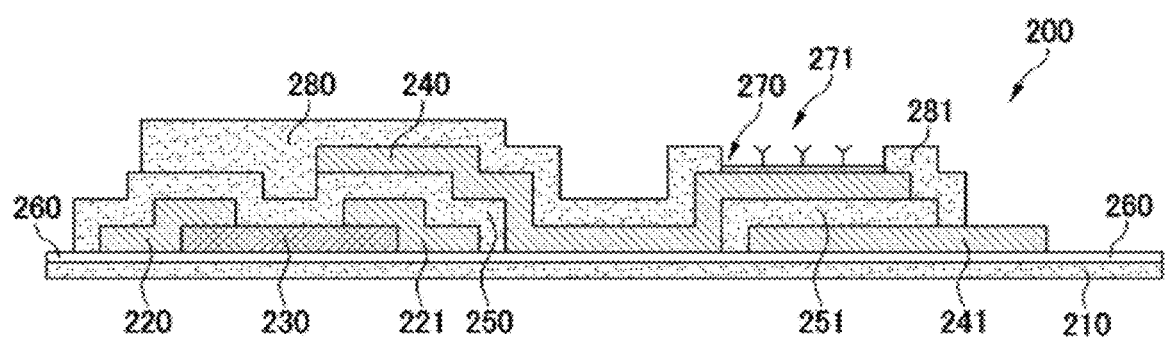
FIG. 2 is a schematic diagram showing a structure of a nanobio-sensing device according to an embodiment of the present disclosure.

Referring to FIG. 2, in a nanobio-sensing device 200 according to one embodiment of the present disclosure, a source electrode 220 and a drain electrode 221 are disposed to be spaced apart from each other on a substrate 210 and a sensing film 230 is disposed between the source electrode 220 and the drain electrode 221. An insulating film 250 is disposed on the source electrode 220, the drain electrode 221, and the sensing film 230, and a first gate electrode 240 is disposed on the insulating film 250 and extends in a state in which one end thereof is in contact with a part of the sensing film 230. In addition, a receptor 271 is provided in an open area 270 on the other end of the first gate electrode 240, and an insulating film 251 and a second gate electrode 241 are disposed on a surface opposite to the open area 270 at the other end of the first gate electrode 240 to overlap the first gate electrode 240, which forms a first gate stacked structure, thereby forming capacitance. In this case, a change in charge density occurring on a surface of the open area 270 causes a change in charge density on a surface of the first gate electrode 240. This change may induce a change in the channel current of the sensing film 230 through the first gate electrode 240 integrally connected to the drain electrode 221 and the surface of the sensing film 230, and by measuring the change in the current, the concentration of the target material may be quantified. At the same time, capacitance is formed due to the first gate stacked structure formed on the other end of the first gate electrode 240, and due to the capacitance, a voltage applied to the second gate electrode 241 may induce an electrical change in the other end of the first gate electrode 240. Accordingly, even by applying a small threshold voltage to the second gate electrode 241, a change in current in the sensing film 230 may be sensitively measured through the first gate electrode 240. That is, by forming capacitance, the nanobio-sensing device 200 of FIG. 2 according to one embodiment of the present disclosure may achieve a high-sensitivity sensing performance capable of detecting a change in current of the sensing film with only a smaller threshold voltage compared to the bio-sensing device of FIG. 1 according to the prior art.

In addition, since the first gate electrode 240 of FIG. 2 is a floating gate and a predetermined voltage is not directly applied thereto unlike the gate electrode 112 of FIG. 1, there is no significant influence on the sensing film 230, and hence, the nanobio-sensing device 200 according to one embodiment of the present disclosure can implement a high-sensitivity sensing performance. Also, the sensing film 230 is not in direct contact with the liquid sample containing the target material, which may solve the problem of contamination of the sensing film 230 by the liquid sample.

A second aspect of the present disclosure provides a nanobio-sensing device including: a substrate: a source electrode and a drain electrode disposed on the substrate and spaced apart from each other; a sensing film which serves as a channel connecting the source electrode and the drain electrode and is in contact with at least a part of the source electrode and the drain electrode; a first gate electrode which is a floating gate, extends while one end thereof is in contact with a part of the sensing film, and is capable of being in contact with a part of the source electrode and/or the drain electrode; a second gate electrode which is a floating gate and has one end in contact with a part of the other end of the first gate electrode to form a first gate stacked structure; and a third gate electrode in contact with a part of the other end of the second gate electrode to form a second gate stacked structure.

In the nanobio-sensing device of the second aspect of the present disclosure, an insulating film may be included between the source electrode, the drain electrode, the sensing film, and the first gate electrode; between the first gate electrode and the second gate electrode; and between the second gate electrode and the third gate electrode. Specifically, the insulating film may include a silicon oxide film, a silicon nitride film, or an insulating thin film containing silicon oxide, but is not limited thereto.

In the nanobio-sensing device of the second aspect of the present disclosure, the first gate stacked structure may be provided with an open area including a receptor that is attached onto the second gate electrode and is capable of binding to a target material.

Figure 3:
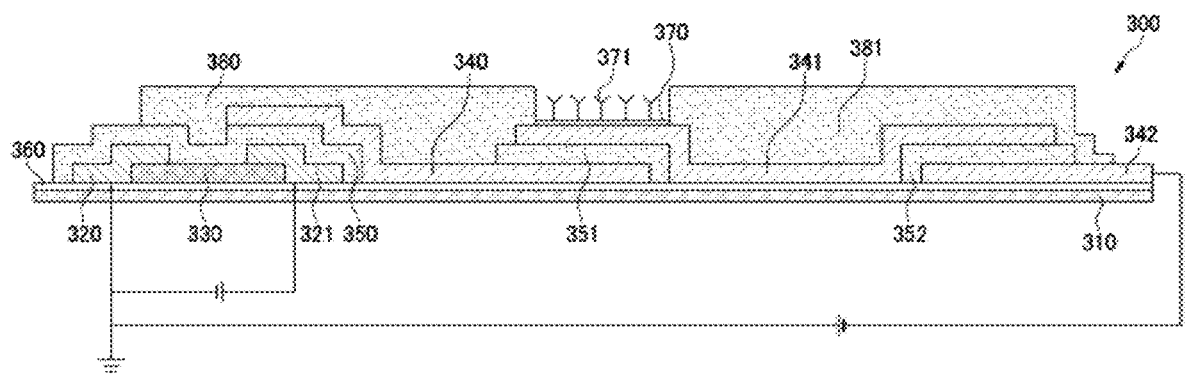
FIG. 3 is a schematic diagram showing a structure of a nanobio-sensing device according to an embodiment of the present disclosure.

Referring to FIG. 3, in the nanobio-sensing device 300 according to one embodiment of the present disclosure, a source electrode 320 and a drain electrode 321 are disposed to be spaced apart from each other on a substrate 310 and a sensing film 330 is disposed between the source electrode 320 and the drain electrode 321. An insulating film 350 is disposed on the source electrode 320, the drain electrode 321, and the sensing film 330, and a first gate electrode 340 is disposed on the insulating film 350 and extends in a state in which one end thereof is in contact with a part of the sensing film 330. In addition, an insulating film 351 and one end of a second gate electrode 341 are disposed on the other end of the first gate electrode 340 to overlap the other end of the first gate electrode 340, which forms a first gate stacked structure, thereby forming capacitance. In addition, an open area 370 provided with a receptor 371 is positioned on a surface opposite to a surface facing the insulating film 351 at one end of the second gate electrode 341. An insulating film 352 and a third gate electrode 342 are disposed on the other end of the second gate electrode 341 to overlap the other end of the second gate electrode 341, which forms a second gate stacked structure, thereby forming capacitance. In this case, a change in charge density occurring on a surface of the open area 370 causes a change in charge density on a surface of the second gate electrode 341, which causes a change in the surface charge in the other end of the first gate electrode 340 and at the same time causes a change in the surface charge in one end of the first gate electrode 340. The change in the surface charge at one end of the first gate electrode 340 induces a change in the channel current of the sensing film 230 and the concentration of the target material may be quantified by measuring the change in the current. Further, capacitance is formed due to the second gate stacked structure formed on the other end of the second gate electrode 341, and due to the capacitance, a voltage applied to the third gate electrode 342 may induce an electrical change in the other end of the second gate electrode 341. Accordingly, even by applying a small threshold voltage to the third gate electrode 342, a change in current in the sensing film 330 may be sensitively measured through the second gate electrode 341 and the first gate electrode 340. That is, by forming two capacitances, the nanobio-sensing device 300 of FIG. 3 according to the present disclosure may achieve a super high sensitivity sensing performance capable of detecting a change in current of the sensing film with only a smaller threshold voltage compared to the bio-sensing device of FIG. 2 which forms one capacitance.

In addition, since the first gate electrode 340 and the second gate electrode 341 of FIG. 3 are floating gates and a predetermined voltage is not directly applied thereto unlike the gate electrode 112 of FIG. 1, there is no significant influence on the sensing film 330, and hence the nanobio-sensing device 300 according to one embodiment of the present disclosure can realize a high sensitivity sensing performance. Also, the sensing film 330 is not in direct contact with a liquid sample containing the target material, which may solve the problem of contamination of the sensing film 330 by the liquid sample.

In one embodiment of the present disclosure, the first gate electrode 240 and the second gate electrode 241 are floating gates and may be connected in series. Specifically, when the first gate electrode 240 and the second gate electrode 241 are connected in series, a capacitance satisfies $1/C = 1/C_1 + 1/C_2$ and a voltage satisfies $V = V_1 + V_2$. That is, when the series connection is made, in $Q = C*V$, Q is fixed but C decreases and V increases, so that detection can be accomplished even with a small threshold voltage.

In one embodiment of the present disclosure, the substrate may be a conductive substrate or an insulating substrate, but is not limited thereto. Specifically, the substrate may be one of or more of solid substrates made of glass, quartz, silicon (Si), polymer plastic, germanium, metal, oxide, and mixtures thereof, but is not limited thereto.

In one embodiment of the present disclosure, an insulating layer may be further included on the substrate, but the present disclosure is not limited thereto. Specifically, the insulating layer may be included between the substrate and the source electrode; between the substrate and the drain electrode; between the substrate and the sensing film; between the substrate and the first gate electrode; between the substrate and the second gate electrode; or between the substrate and the third gate electrode. Also, the insulating layer is provided to prevent an electrical short circuit between the substrate and the source electrode, the drain electrode, the first gate electrode, the second gate electrode, and the third gate electrode, and may include a silicon oxide film, a silicon nitride film, a metal oxide, such as $Al_2O_3$ and $HfO_2$, an organic layer, such as a self-assembled monolayer (SAM), or a photoresist, but is not limited thereto.

The silicon oxide film may include a high density plasma (HDP) film, a borophosphosilicate glass (BPSG) film, a phosphorus silicate glass (PSG) film a plasma-enhanced tetra-ethyl-ortho-silicate (PETEOS) film, an un-doped silicate glass (USG) film, a fluorinated silicate glass (FSG) film, a carbon doped oxide (CDO) film, or an organo-silicate glass (OSG) film, but is not limited thereto.

In one embodiment of the present disclosure, the source electrode, the drain electrode, the first gate electrode, or the second gate electrode may include at least one conductive material. Specifically, the conductive material may include gold (Au), copper (Cu), or doped indium tin oxide (ITO), but is not limited thereto.

In one embodiment of the present disclosure, the sensing film may include single-wall carbon nanotube (SWCNT), graphene, molybdenum disulfide (MoS2), IGZO, or phosphorene, but is not limited thereto. Specifically, the SWCNT sensing film may be implemented by supplying a liquid-state precursor solution to a region including a space between the source electrode and the drain electrode, and solidifying the precursor solution. In addition, the solidifying process may include natural drying, heat drying, or fan drying, but is not limited thereto. Further, since CNT has good charge transfer characteristics and a large aspect ratio to secure a plurality of charge transfer paths, thereby simultaneously achieving high charge mobility and high transparency, and has high elasticity that allows the CNT to be electrically and mechanically stable against large bending, the CNT is suitable for use as a sensing film.

In one embodiment of the present disclosure, a passivation film disposed on the first gate electrode or the second gate electrode, except for the open area, may be included, but the present disclosure is not limited thereto. The first gate electrode or the second gate electrode may be exposed to the outside through the open area, and the receptor capable of binding to a target material may be provided in the exposed portion. Specifically, the passivation film may be disposed on the first gate electrode or the second gate electrode, and a portion of the disposed passivation film may be etched or patterned to form an open area exposing a part of the floating gate.

The passivation film may be composed of phosphosilicate, silicon nitride, oxynitride, photoresist, or polymer, and a chemical vapor deposition (CVD), plasma enhanced chemical vapor deposition (PECVD), spin coating, or spray coating method may be used to form the passivation film, but aspects of the present disclosure are not limited thereto.

In one embodiment of the present disclosure, the receptor may include one or more selected from among an enzyme-substrate, a ligand, an amino acid, a peptide, an aptamer, a protein, a nucleic acid, a lipid, and a carbohydrate, but is not limited thereto.

In one embodiment of the present disclosure, the receptor is attached onto the sensing film by a functional group, and the functional group may include one or more selected from among an amine group, a carboxyl group, and a thiol group, but is not limited thereto.

In one embodiment of the present disclosure, the target material may include one or more selected from among a protein, a peptide, an aptamer, a nucleic acid, an oligosaccharide, an amino acid, a carbohydrate, a dissolved gas, a sulfur oxide gas, a nitrogen oxide gas, a residual pesticide, a heavy metal, and an environmentally harmful substance, but is not limited thereto.

A third aspect of the present disclosure provides a method of sensing a target material by measuring the concentration of the target material using the nanobio-sensing device according to the first aspect or the second aspect.

In the first to third aspects, what may be common across these aspects may be applied to all of the first to third aspects even if the description thereof is omitted.

In one embodiment of the present disclosure, the target material may be introduced through the open area, and the target material in a sample solution may include probe molecules or non-specific molecules. Specifically, the sample solution may include a body fluid such as a blood, a blood plasma, a blood serum, an interstitial fluid, a lavage, perspiration, saliva, urine, and so on, but is not limited thereto.

Figure 4:
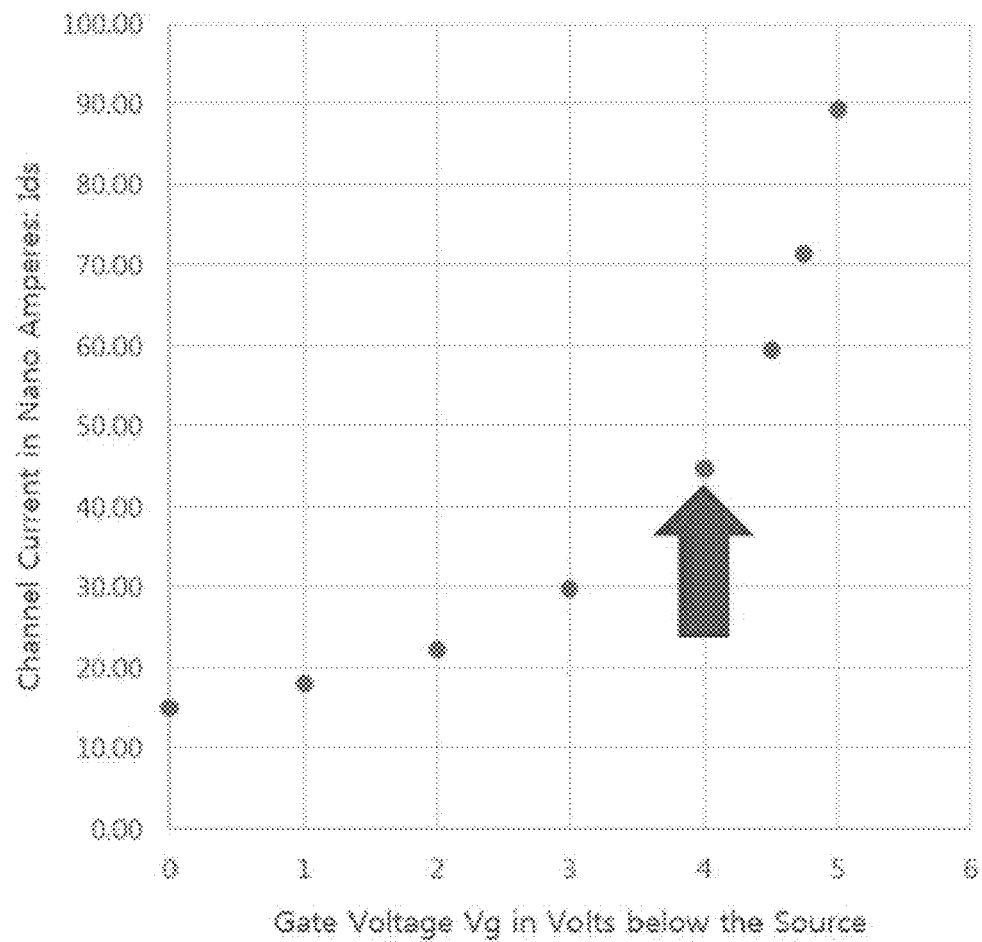
FIG. 4 is a graph showing Ids vs. Vg of a nanobio-sensing device according to an embodiment of the present disclosure.

The operation principle of the nanobio-sensing device according to one embodiment of the present disclosure will now be described with reference to FIGS. 4 to 6. Referring to FIG. 4, a voltage Vg of 0 to 5 volts may be applied to a source electrode of a FET channel. At this time, current Ids flowing between the source electrode and a drain electrode has a range of 15 nA to 90 nA, and the applied voltage Vg is actually an external gate input value of the FET, and when no antigen is introduced, the voltage assumes an initial gate value $Vg_o$. A value of $Vg_o$ is determined by a value of a channel capacitance $C_o$ and a distributed charge Qo according to Q=C*V. In one embodiment of the present disclosure, a value of $Q_o/C_o (=Vg_o)$ is designed to be 1 volt.

Figure 5:
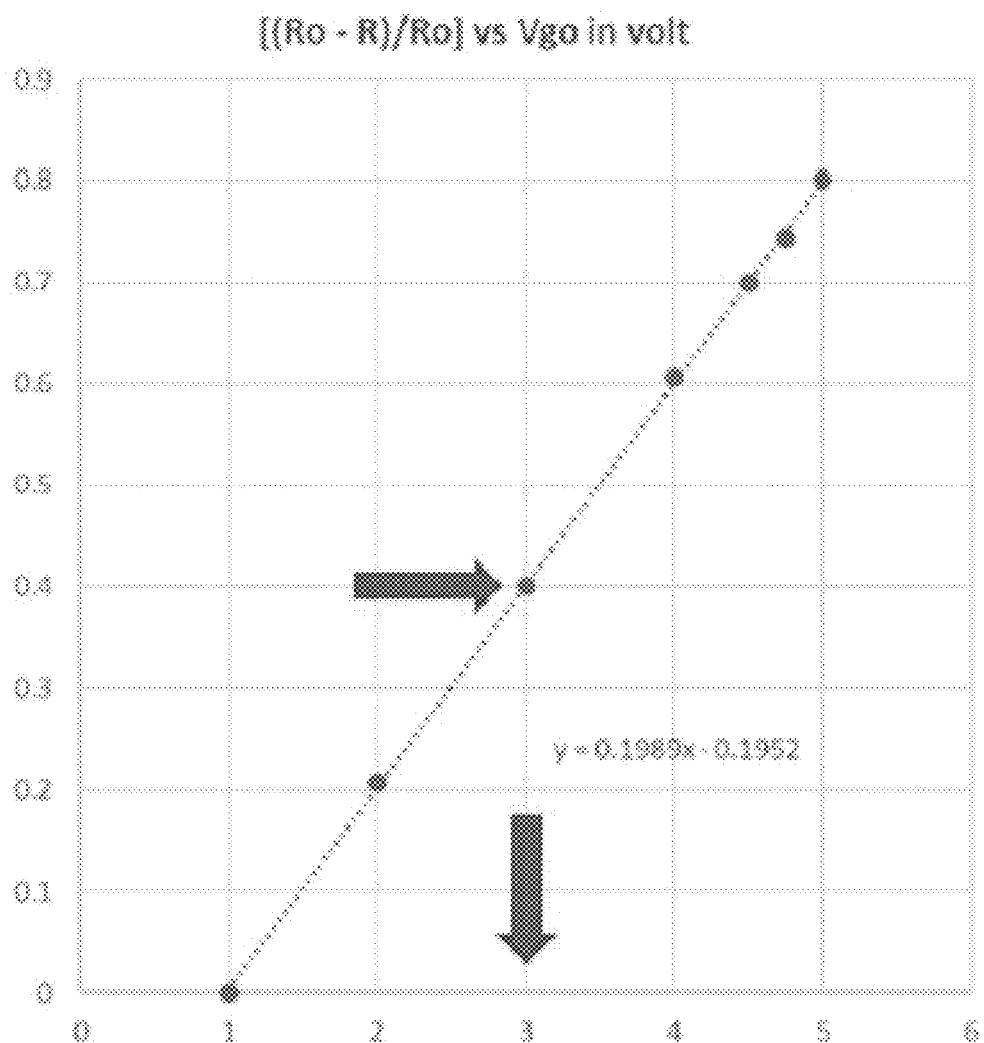
FIG. 5 is a graph showing (I-R/Ro) vs. $Vg_o$ of a nanobio-sensing device according to an embodiment of the present disclosure.

Referring to FIG. 5, when $Vg=Vg_o=1$ volt, a straight line value may be derived by measuring a current Ids and calculating a value of (1−R/Ro) using, as a reference value, a value of resistance Ro that corresponds to the reciprocal of the measured current Ids. Through the straight line in FIG. 5, it is possible to obtain the density of antigen bound to antibody by measuring the total amount of charge according to charge transfer after the injection of the antigen. Specifically, a circuit measurement value Ids on the vertical axis of the graph of FIG. 4 is read by a reader, and a value of R(=Vds/Ids; Vds=0.1 volts) is calculated from the read Ids. By putting the value of R on the vertical axis of the graph in FIG. 5, it is possible to obtain a value of Vg from the horizontal axis of a straight line graph, and Q value (Vg=Q/Co) is obtained from the obtained value of Vg, which may be expressed as $Q=Q_o-Qdel$. It is possible to obtain the density of antigen bound to antibody from the Qdel.

Figure 6:
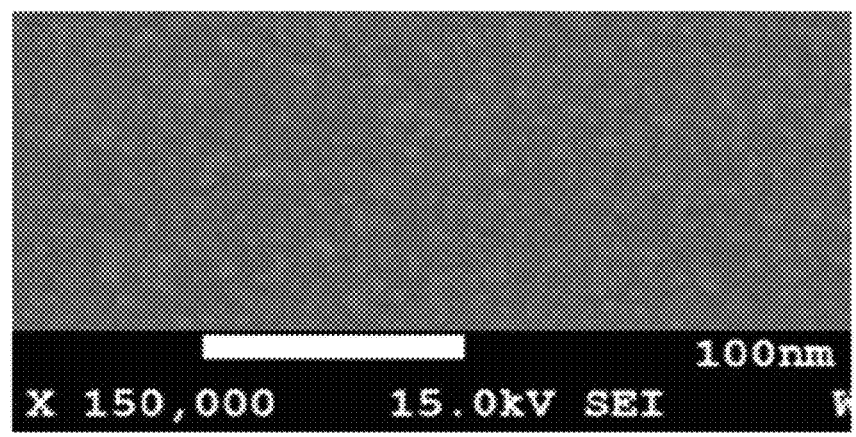
FIG. 6 is a scanning electron microscope (SEM) photograph showing a part of an open area to which a receptor is attached in the nanobio-sensing device according to an embodiment of the present disclosure.

Referring to FIG. 6, a part of the open area to which antibodies are bound can be observed, and the antibodies are randomly arranged at a density of one antibody per area with a radius of 5 nm to 10 nm. When antigen is injected and bound to the antibody, an additional change in the amount of charge occurs. The amount of charge generated at this time induces a change in current in the other end of the first gate as shown in FIGS. 4 and 5, and this may be detected by the sensing film. In one embodiment of the present disclosure, it was confirmed that, after the antigen was introduced, the capacitance at the other end of the first gate was $2 \times 10^{-10}$ F, the charge value was $4 \times 10^{-10}$ C, and the density of antigen bound to the antibody could be calculated by measuring the Qdel as $10^{-8}$ C to $10^{-11}$ C.

The nanobio-sensing device according to the embodiments of the present disclosure has an advantage of realizing high-sensitivity sensing performance because it can detect a change in current of the sensing film with only a smaller threshold voltage compared to the conventional bio-sensing device by forming capacitance.

In the bio-sensing device of the prior art, since a receptor area is implemented on a sensing film, a current noise signal by a target material binding to a receptor and interfering molecules present in buffer liquid may directly affect the channel current of the sensing film, which makes it difficult to realize high-sensitivity sensing performance. However, the nanobio-sensing device according to the embodiments of the present disclosure uses the floating gate and thus does not significantly affect the channel current of the sensing film by the gate electrode, so that it is possible to realize high-sensitivity sensing performance.

In the bio-sensing device of the prior art, the sensing film directly contacts a liquid sample containing a target material, and hence there is a problem in that the sensing film may be contaminated by the liquid sample. However, in the nanobio-sensing device according to the embodiments of the present disclosure, the open area into which a liquid sample is injected is designed to be separate from the sensing film, which may solve the problem of contamination of the sensing film by the liquid sample.

In the bio-sensing device of the prior art using a liquid gate, the liquid gate must be installed in an open area in order to measure a threshold voltage shift or a change in the charge mobility caused by injection of a liquid sample. Therefore, (i) when the buffer liquid evaporates or is in a trace amount, measurement is difficult, (ii) an electrical signal of antibody-antigen is often much lower than an interference signal due to the dielectric effect of the buffer liquid, and (iii) when the buffer liquid contains a large amount of water, electrical measurement of the electrical signal of antibody-antigen is difficult. On the other hand, the nanobio-sensing device according to the embodiments of the present disclosure is able to measure charge mobility by using the floating gate on a lower portion of the open area without additional installation of a liquid gate. Therefore, (i) there is no negative effect due to the liquid gate, so that the antigen contained in the buffer liquid binds to antibody in a short time, and even if the buffer liquid evaporates or is in a trace amount, it is easy to sense an electrical signal, and measurement is possible regardless of whether a sample is in a liquid or gaseous state. In addition, (ii) the electrical signal due to the antibody-antigen reaction is much higher than an interference signal due to the buffer liquid, and thus it is possible to accomplish high sensitivity, and (iii) even when the buffer liquid contains a large amount of water, the dielectric effect of water does not interfere with the antibody-antigen signal and it is possible to selectively amplify the antibody-antigen signal.

The above description of the present disclosure is provided for the purpose of illustration, and it would be understood by those skilled in the art that various changes and modifications may be made without changing technical conception and essential features of the present disclosure. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, or device are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A nanobio-sensing device comprising:
a substrate;
a source electrode and a drain electrode disposed on the substrate and spaced apart from each other;
a sensing film which serves as a channel connecting the source electrode and the drain electrode and is in contact with at least apart of the source electrode and the drain electrode;
a first gate electrode which is a floating gate, extends while one end of the first gate electrode is in contact with a part of the sensing film, and is capable of being in contact with a part of the source electrode and/or the drain electrode;
a second gate electrode which is a floating gate and has one end in contact with a part of the other end of the first gate electrode to form a first gate stacked structure; and
a third gate electrode in contact with a part of the other end of the second gate electrode to form a second gate stacked structure.

2. The nanobio-sensing device of claim 1, further comprising an insulating film between the source electrode, the drain electrode, the sensing film, and the first gate electrode; between the first gate electrode and the second gate electrode; and between the second gate electrode and the third gate electrode.

3. The nanobio-sensing device of claim 1, further comprising an insulating layer on the substrate.

4. The nanobio-sensing device of claim 1, wherein the first gate stacked structure is provided with an open area including a receptor that is attached onto the second gate electrode and is capable of binding to a target material.

5. The nanobio-sensing device of claim 4, further comprising a passivation film disposed on the first gate electrode or the second gate electrode, except for the open area.

6. The nanobio-sensing device of claim 4, wherein the receptor includes one or more selected from among an enzyme-substrate, a ligand, an amino acid, a peptide, an aptamer, a protein, a nucleic acid, a lipid, and a carbohydrate.

7. The nanobio-sensing device of claim 4, wherein the receptor is attached onto the sensing film by a functional group and the functional group includes one or more selected from among an amine group, a carboxyl group, and a thiol group.

8. The nanobio-sensing device of claim 4, wherein the target material includes material includes one or more selected from among a protein, a peptide, an aptamer, a nucleic acid, an oligosaccharide, an amino acid, a carbohydrate a dissolved gas, a sulfur oxide gas, a nitrogen oxide gas, a residual pesticide, a heavy metal, and an environmentally harmful substance.

9. The nanobio-sensing device of claim 1, wherein the nanobio-sensing device measures a concentration of a target material to sense the target material.

\* \* \* \* \*